C. B. Horton.
Flour Bolt.
N° 81,086. Patented Aug. 18, 1868.
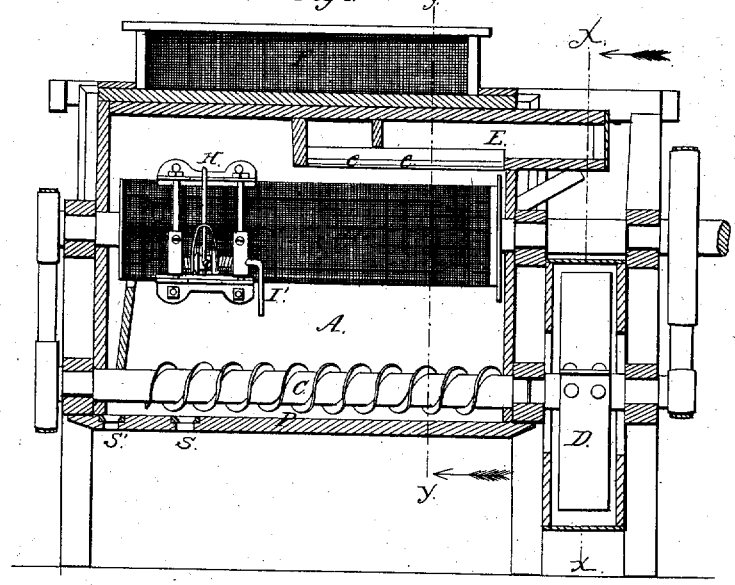
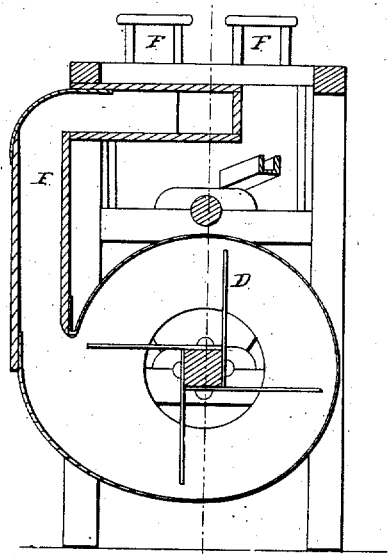
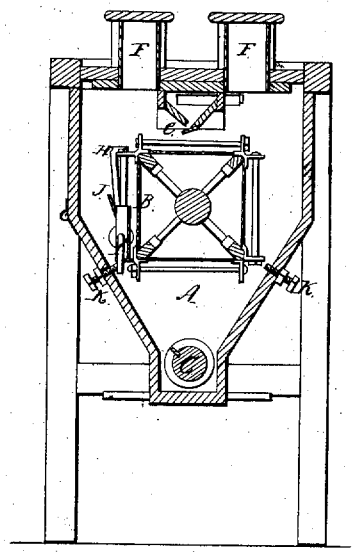
Witnesses: Inventor.

United States Patent Office.

CHACE B. HORTON, OF SAND BANK, NEW YORK.

Letters Patent No. 81,086, dated August 18, 1868.

IMPROVED FLOUR-BOLT.

*The Schedule referred to in these Letters Patent and making part of the same.*

TO ALL WHOM IT MAY CONCERN:

Be it known that I, CHACE B. HORTON, of Sand Bank, in the county of Oswego, and State of New York, have invented a new and useful Improvement in Flour-Bolts; and I do hereby declare the following to be a full, clear, and exact description thereof, reference being had to the accompanying drawings, which are made a part of this specification.

My invention has for its objects the cooling and ventilating of the interior of flour-bolts, and keeping the meshes of the cloth clear of flour, meal, or other matter.

In cooling and ventilating the interior of the bolt-chest, by forcing a current of air into it, great difficulty has been experienced in providing for the egress of the warm air in such a way that it would not carry flour, bran, or other matters with it. This difficulty I have effectually removed by providing in the top of the bolt-chest, or in other convenient part of the apparatus, an ample area of ventilation-spaces, protected by any suitable cloth or wire gauze, which, while permitting the passage of air, will prevent the escape of flour.

My invention further consists in an improved rapper, mounted upon the transverse stays of the bolting-cylinder, and acting on its exterior surface, as hereinafter explained.

In the drawings—

Figure 1 represents a vertical longitudinal section of a flour-bolt, illustrating my invention, the bolt-cylinder and other central parts being shown in elevation.

Figure 2 is a transverse section, in the plane indicated by the line $x\ x$ in fig. 1.

Figure 3 is a transverse section in the plane indicated by the line $y\ y$, fig. 1.

The bolt-chest A, bolt-cylinder B, conveyer C, pitch-board P, and spouts S S' may be of usual form. A blower of any suitable construction (represented in the present illustration by a rotary fan, D,) is employed to produce a strong blast of air, which is conducted by spouts or tubes E to the interior of the bolt-chest, and delivered through a slot, $e$, so as to strike the surface of the bolt-cloth obliquely.

This current of air effectually prevents any accumulation of flour or foreign matters upon or within the meshes of the cloth, and serves likewise to constantly cool the flour in process of bolting.

The large volume of air thus introduced necessarily produces pressure within the bolt-chest, and it has been found that, without some special provision to prevent it, this pressure will cause the escape of a large amount of flour, which is in fine particles, held in suspension by the air within the chest.

To prevent this loss, I provide in the top, or in the upper part of the sides, or in other convenient part or parts of the casing of the chest, ventilating-spaces F F, of large area, which may be covered with bolting-cloth, wire gauze, coarse cotton cloth, or other material which may serve to arrest the flour while permitting the escape of air.

The inclination of the pitch-board P, and its conveyance toward the end of the chest, cause a slight obstruction to the discharge of bran, and thus will prevent the escape of air at this point, but, as an additional protection, the long sack, which receives the bran from the spout S', may be tied at a considerable distance below the spout, and, when it becomes filled with bran, opened and retied.

My improved rapper to dislodge flour from the meshes of the cloth, and from clinging around the ribs of the bolt-cylinder, consists of a hammer, H, secured to a pivot or shaft, I, from which projects a rigid arm, I'. The spring J drives the hammer down when it is released from the tappets K K', with which tappets the arm I' comes in contact to raise the hammer, as the cylinder B revolves.

In practice, I employ three of these rappers around a common hexagonal or six-ribbed bolt, that is to say, once to each two ribs, being attached, as represented, to the stays L. Similar sets of three may be used wherever desired along the length of the bolt, either with or without the blast-apparatus. The tappets K K' may be conveniently made, as in the present illustration, of set-screws, adapted to be turned in or out to give hammers heavier or lighter strokes, or avoid acting on them at all at either or both places. Common jam-nuts are placed upon these set-screws to secure them.

With a six-ribbed bolt, the hammer, when raised by the first tappet K, will strike in an upward direction against the lowest rib of the bolt. This I find to be the most effective blow for discharging flour from the cloth.

The blow which is imparted by the second tappet K' acts horizontally against the rib, and serves to dislodge any accumulation of meal which may have collected in the angle between the rib and the cloth.

It will be understood that the blast-apparatus may be used without the rappers, or the latter without the former, or they may be used together without interfering with each other.

The foregoing description and the accompanying drawings, without representing the relative proportions of parts which exist in the actual machine, will serve to convey to the practical miller and millwright a clear understanding of the two parts of my invention.

I do not claim precipitating flour from the air by means of a "collecting-chamber," with slats projecting from its top and bottom alternately, as described in William F. Cochrane's patent, granted January 6, 1863; but

What I claim as new, and desire to secure by Letters Patent, is—

1. The combination of the blast-apparatus D E e, for supplying air to the interior of the bolt-chest, with ventilators F, constructed of any suitable cloth, and arranged substantially as herein set forth, for the purposes stated.

2. I further claim the arrangement of spring rappers H I I' J, mounted transversely upon the exterior of the bolt-chest, and operating in the manner and for the purposes specified.

CHACE B. HORTON.

Witnesses:
  OCTAVIUS KNIGHT,
  W. B. DEMING.